US009204412B2

(12) United States Patent
Vargantwar

(10) Patent No.: US 9,204,412 B2
(45) Date of Patent: Dec. 1, 2015

(54) USER DEVICE TIMING ADVANCE DETERMINATION

(71) Applicant: Cellco Partnership, Basking Ridge, NJ (US)

(72) Inventor: Sachin Vargantwar, Macon, GA (US)

(73) Assignee: Cellco Partnership, Basking Ridge, NJ (US)

( * ) Notice: Subject to any disclaimer, the term of this patent is extended or adjusted under 35 U.S.C. 154(b) by 254 days.

(21) Appl. No.: 13/662,112

(22) Filed: Oct. 26, 2012

(65) Prior Publication Data
US 2014/0119206 A1 May 1, 2014

(51) Int. Cl.
H04W 56/00 (2009.01)
H04W 36/00 (2009.01)

(52) U.S. Cl.
CPC .......... *H04W 56/0045* (2013.01); *H04W 56/00* (2013.01); *H04W 36/0083* (2013.01)

(58) Field of Classification Search
CPC ....... H04W 4/02; H04W 64/00; H04W 36/00; H04W 56/0045; H04W 60/04; H04W 64/003; H04W 36/0083; H04W 36/0066; H04W 36/32; H04W 72/0413; H04W 24/00; H04W 56/006; H04W 56/00
USPC ......... 370/255, 280, 328, 331, 338, 442, 458, 370/503
See application file for complete search history.

(56) References Cited

U.S. PATENT DOCUMENTS

| 7,167,482 | B1 * | 1/2007 | Menzel et al. | 370/442 |
| 7,280,831 | B2 * | 10/2007 | Moilanen et al. | 455/436 |
| 8,526,420 | B2 * | 9/2013 | Weng et al. | 370/350 |
| 2004/0102893 | A1 * | 5/2004 | Atkinson et al. | 701/117 |
| 2005/0053099 | A1 * | 3/2005 | Spear et al. | 370/508 |
| 2007/0149206 | A1 * | 6/2007 | Wang et al. | 455/450 |
| 2008/0225796 | A1 * | 9/2008 | Malladi et al. | 370/331 |
| 2008/0267131 | A1 * | 10/2008 | Kangude et al. | 370/331 |
| 2009/0161599 | A1 * | 6/2009 | Haartsen et al. | 370/326 |
| 2009/0238126 | A1 * | 9/2009 | Sato et al. | 370/329 |
| 2009/0318175 | A1 * | 12/2009 | Sandberg | 455/502 |
| 2010/0290427 | A1 * | 11/2010 | Sebire et al. | 370/331 |
| 2011/0103499 | A1 * | 5/2011 | Cheng et al. | 375/260 |
| 2011/0222527 | A1 * | 9/2011 | Hole et al. | 370/348 |
| 2012/0014371 | A1 * | 1/2012 | Weng et al. | 370/350 |
| 2012/0087270 | A1 * | 4/2012 | Wan et al. | 370/252 |
| 2012/0269172 | A1 * | 10/2012 | Chin et al. | 370/332 |
| 2012/0289178 | A1 * | 11/2012 | Matsumura et al. | 455/403 |

(Continued)

OTHER PUBLICATIONS

Edge et al., Device to Device Location, May 23, 2012, U.S. Appl. No. 61/650,951.*

*Primary Examiner* — Gary Mui
*Assistant Examiner* — Michael Phillips

(57) ABSTRACT

A user device may: receive, from a network device, timeslot information and a first timing advance value. The first timing advance value may be used by the user device to send a data block to the first network device in accordance with the timeslot information. The user device may further: determine a first distance corresponding to a distance between the user device and the network device; determine a change in position of the user device; determine a second distance based on the change in position of the user device; and determine a second timing advance value based on the first timing advance value, the first distance, and the second distance. The second timing advance value may be used by the user device to send the data block to the network device in accordance with the timeslot information.

20 Claims, 5 Drawing Sheets

(56) References Cited

U.S. PATENT DOCUMENTS

| | | | |
|---|---|---|---|
| 2012/0327918 A1* | 12/2012 | Yi et al. | 370/337 |
| 2013/0070726 A1* | 3/2013 | Zhang et al. | 370/331 |
| 2013/0201904 A1* | 8/2013 | Toskala et al. | 370/315 |
| 2013/0310039 A1* | 11/2013 | Wigren et al. | 455/436 |
| 2013/0310043 A1* | 11/2013 | Bakker et al. | 455/436 |
| 2013/0316727 A1* | 11/2013 | Edge | 455/456.1 |
| 2014/0044108 A1* | 2/2014 | Earnshaw et al. | 370/336 |
| 2014/0148187 A1* | 5/2014 | Hong et al. | 455/452.1 |

\* cited by examiner

USER DEVICE TIMING ADVANCE DETERMINATION

BACKGROUND

Cellular base stations are sometimes used to connect a user device with a cellular network to allow the user device to send and/or receive data to perform some task (e.g., browse the web, send and/or receive e-mail, etc.). Cellular base stations may provide the user device with timeslot information to identify when the user device may communicate with a particular channel of the cellular base station. The user device sometimes may not receive the timeslot information when the user device is outside of a querying range of the cellular base station.

DETAILED DESCRIPTION OF THE PREFERRED EMBODIMENTS

Figure 1:
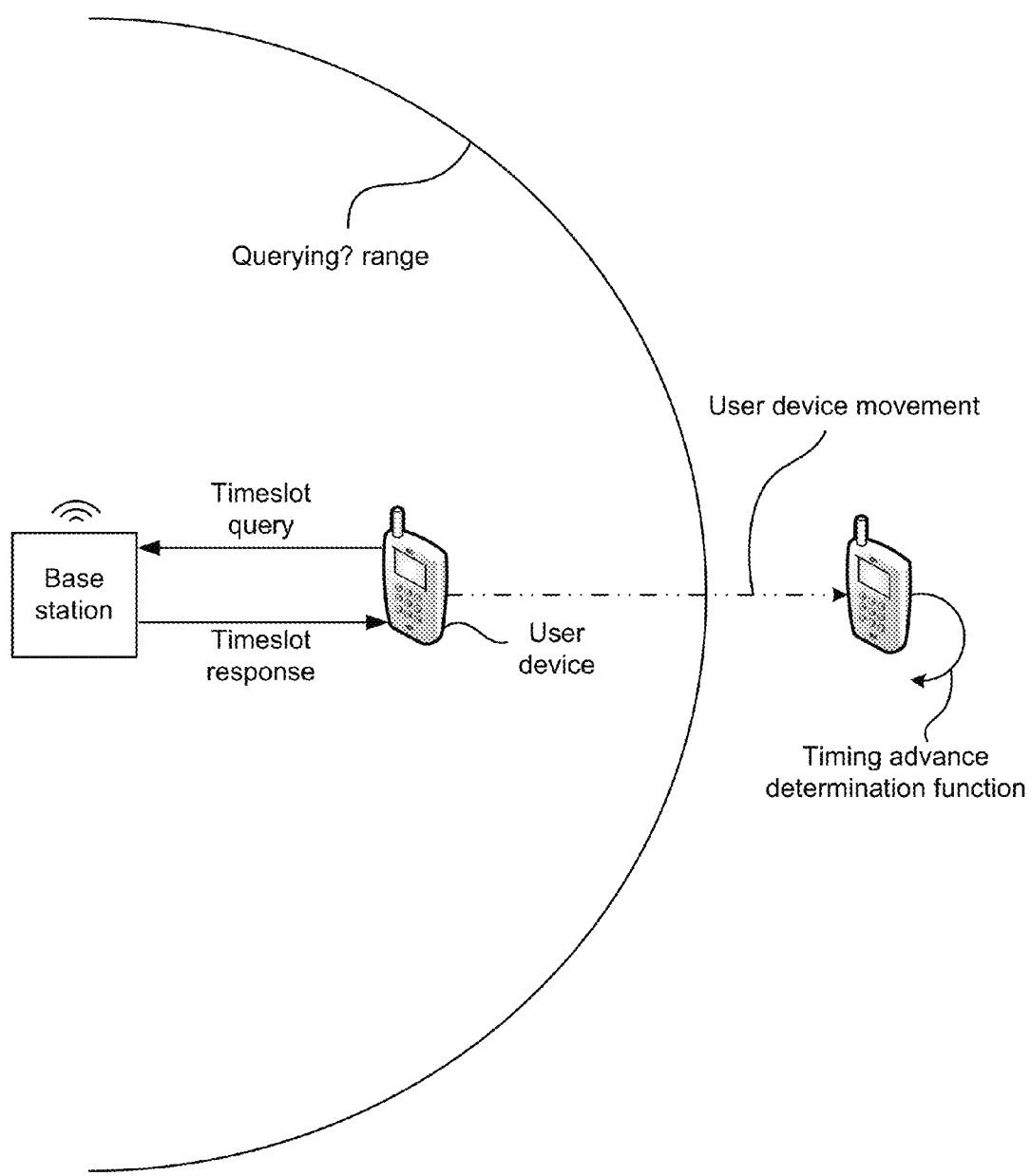
FIG. 1 illustrates an example overview of an implementation described herein.

The following detailed description refers to the accompanying drawings. The same reference numbers in different drawings may identify the same or similar elements.

Systems and/or methods, as described herein, may allow a user device to determine information relating to a timeslot, associated with a network, when the user device is outside of a querying range of a base station, associated with the network (e.g., a range in which the base station may provide timeslot information to the user device).

In some implementations, the timeslot information may include information regarding a scheduled time in which the user device may communicate with the network to send and/or receive data blocks (e.g., in the context of performing a task via the user device, such as browsing the web, streaming audio or video, etc.). In some implementations, a base station, associated with the network, may assign a particular timeslot to a user device.

The timeslot may correspond to portions of time on a continuous scale. For example, the timeslot may correspond to the first millisecond of every second (e.g., user device assigned to the timeslot may send data blocks such that the data blocks are received by the base station at the timeslot corresponding to the first millisecond of every second).

The timeslot information may also include a timing advance. The timing advance may include an instruction to cause the user device to send a data block such that the data block is received by the base station in accordance with the timeslot assigned to the user device. For example, assume that the data block takes one second to be received by the base station when the data block is sent by the user device. The timing advance may cause the user device to send the data block one second earlier than the timeslot associated with the user device. In some implementations, the timing advance may be based on a geographic distance between the user device and the base station (e.g., a greater geographic distance may correspond to a longer timing advance).

In some implementations, the user device may query for a timing advance from a base station associated with the network when the user device is within a querying range of the base station (e.g., a range corresponding to when the base station may respond to a query provided by the user device). Additionally, the user device may determine an updated timing advance when the user device is outside of a querying range of the base station (e.g., when the user device relocates to a geographic region that is outside of the querying range of the base station).

For example, the user device may determine the updated timing advance based on a reference timing advance received by the user device when the user device was within querying range of the base station. The updated timing advance may also be determined based on a difference between a reference distance (e.g., a distance between the user device and the base station when the reference timing advance was received by the user device) and an updated distance (e.g., a distance between a current position of the user device and the base station).

FIG. 1 illustrates an example overview of an implementation described herein. As shown in FIG. 1, assume that a user device is within querying range of a base station (e.g., a wireless base station associated with a cellular network and/or some other base station) and that the user device connects with the base station to allow the user device to perform some task (e.g., browse the web, transfer media files, etc.). In some implementations, the user device may provide a timeslot query to the base station to request information regarding a timing advance associated with an assigned timeslot in which the user device may provide a data block to the base station (e.g., a time determined and/or scheduled by the base station to receive the data block from the user device).

As described above, based on the timing advance the user device may send the data block in a manner such that the data block is received by the base station in accordance with the scheduled time. As shown in FIG. 1, the base station may provide the user device with a timeslot response which includes the information regarding the timing advance. In some implementations, the user device may send timeslot queries at any time while connected to the base station (e.g., to receive updated timing advances which may change as the distance between the user device and the base station changes).

As further shown in FIG. 1, assume that the user device relocates outside of the querying range of the base station such that the user device may not provide timeslot queries or receive timeslot responses from the base station as a result of being outside of the querying range. In some implementations, the user device may perform a timing advance determination function to determine an updated timing advance without relying on receiving the updated timing advance from the base station.

In some implementations, the user device may use the updated timing advanced, determined by the timing advance determination function, to send a data block in accordance with a timeslot in which the base station has scheduled the data block to be received by the base station. As a result of the user device performing the timing advance determination function to determine the updated timing advance, the base station may continue to receive data blocks in accordance with an assigned timeslot even when the user device does not receive the timing advance information from the base station.

Figure 2:
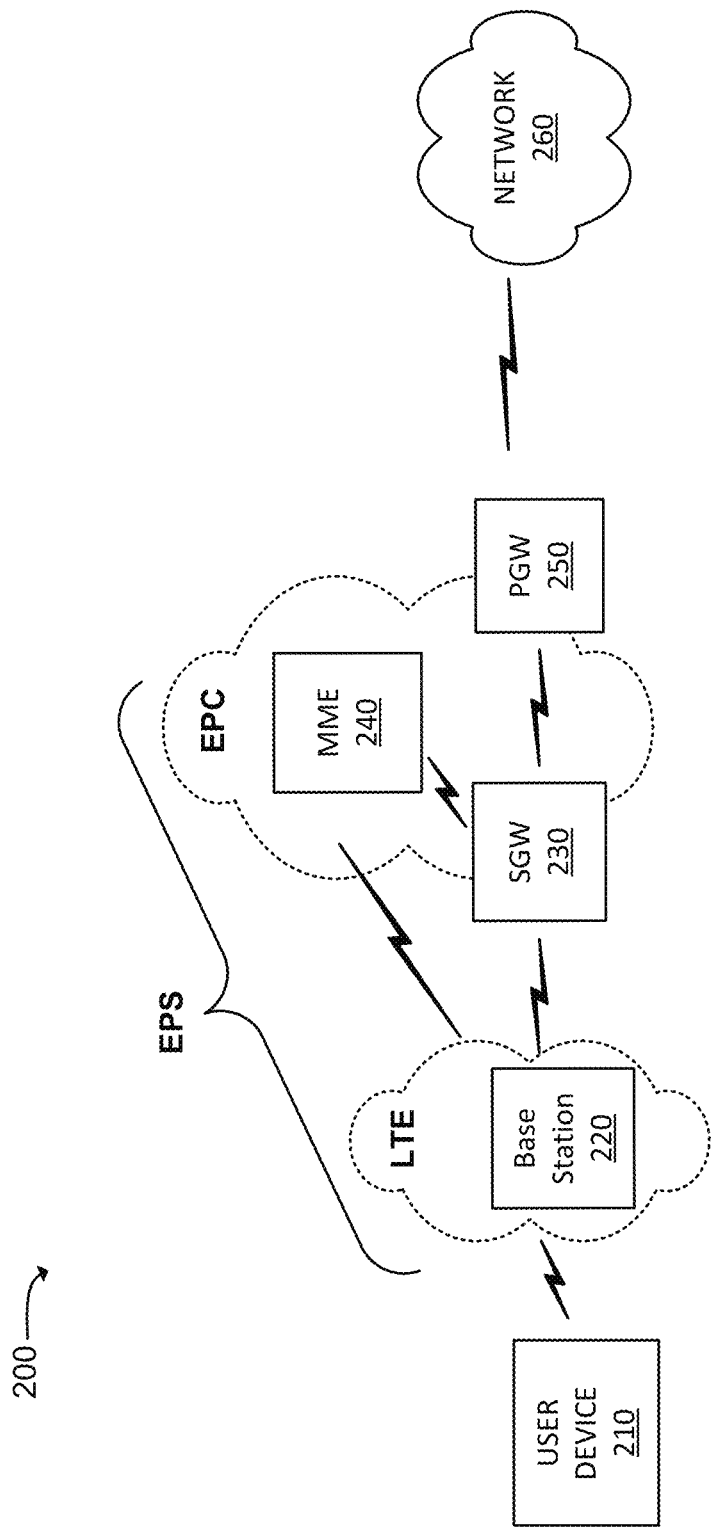
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, base station 220, serving gateway 230 (referred to as "SGW 230"), mobility management entity device 240 (referred to as "MME 240"), packet data network (PDN) gateway (PGW) 250, and network 260.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 that enables user device 210 to communicate with network 260 and/or an Internet protocol (IP) multimedia subsystem (IMS) core. As shown in FIG. 2, the LTE network may include base station 220, and the EPC may include SGW 230, MME 240, and/or PGW 250.

User device 210 may include any computation or communication device, such as a wireless mobile communication device that is capable of communicating with base station 220. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 260.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 260 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 260 via PGW 250.

MME 240 may include one or more computation or communication devices that gather, process, search, store, and/or provide information in a manner described herein. For example, MME 240 may perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210.

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

Network 260 may include one or more wired and/or wireless networks. For example, network 260 may include a cellular network, a public land mobile network (PLMN), a second generation (2G) network, a third generation (3G) network, a fourth generation (4G) network, a fifth generation (5G) network, and/or another network. Additionally, or alternatively, network 260 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
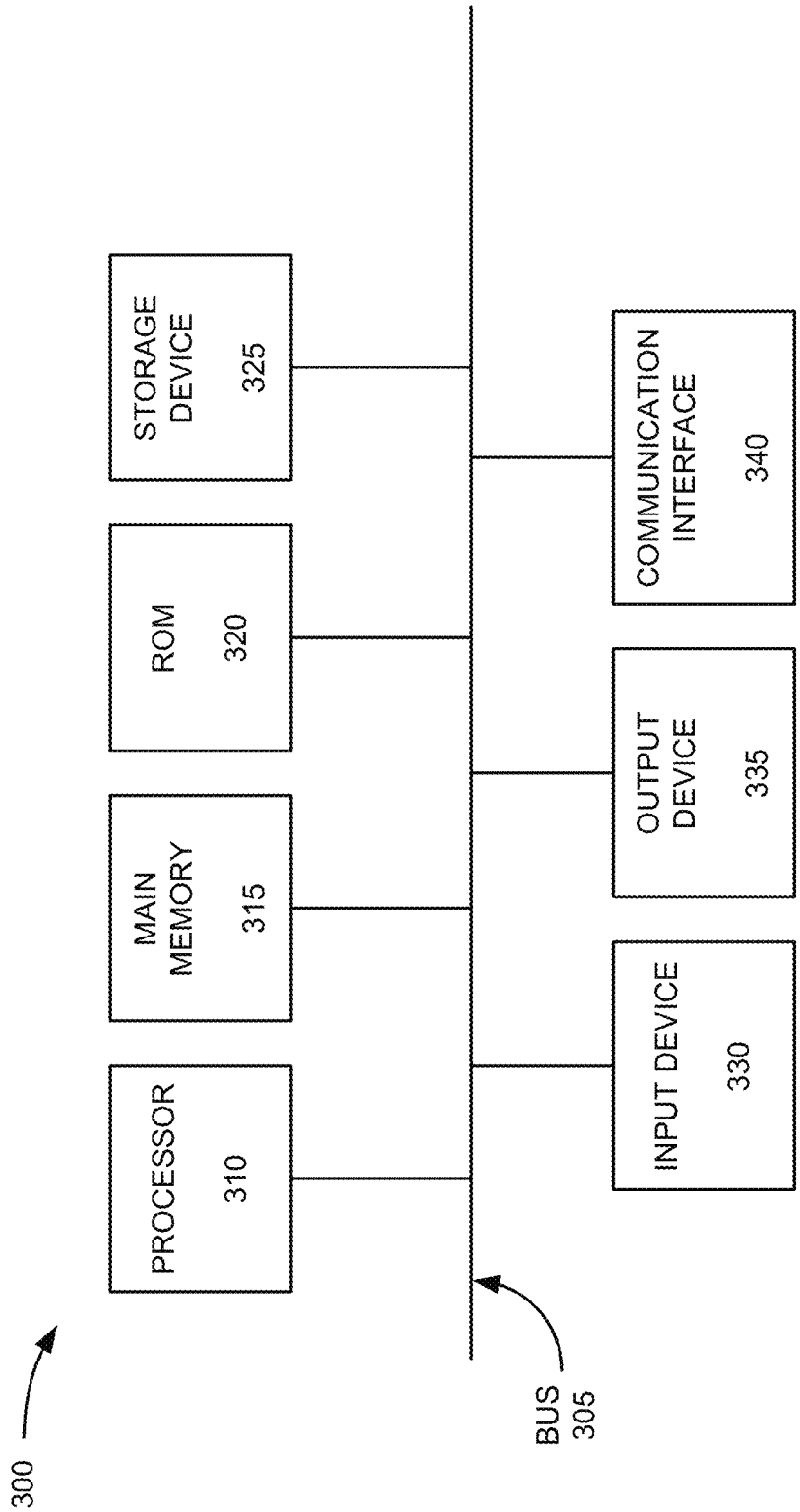
FIG. 3 illustrates example components of a device that may be used within the environment of FIG. 2.

FIG. 3 illustrates example components of a device 300 that may be used within environment 200 of FIG. 2. Device 300 may correspond to user device 210, base station 220, SGW 230, MME 240, and/or PGW 250. Each of user device 210, base station 220, SGW 230, MME 240, and/or PGW 250 may include one or more devices 300, and/or one or more components of device 300.

As shown in FIG. 3, device 300 may include a bus 305, a processor 310, a main memory 315, a read only memory (ROM) 320, a storage device 325, an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
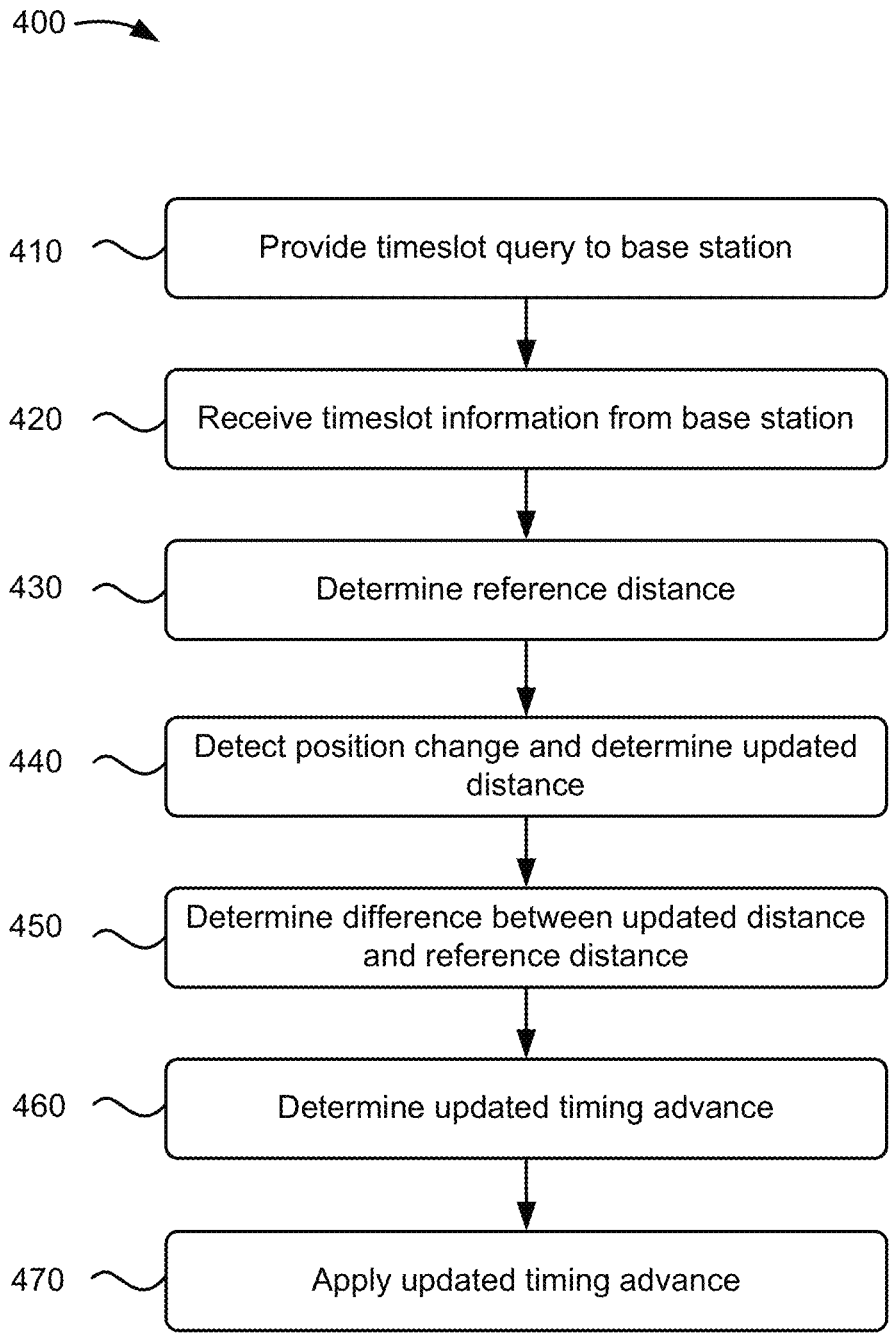
FIG. 4 illustrates a flowchart of an example process for determining a timing advance via a user device.

FIG. 4 illustrates a flowchart of an example process 400 for determining a timing advance. In one implementation, process 400 may be performed by one or more components of user device 210. In another implementation, some or all of blocks of process 400 may be performed by one or more components of another device in environment 200 (e.g., base station 220, SGW 230, MME 240, and/or PGW 250), or a group of devices including or excluding user device 210.

As shown in FIG. 4, process 400 may include providing a timeslot query to a base station (block 410). For example, user device 210 may provide a timeslot query to base station 220 when user device 210 connects with base station 220 (e.g., when a component of user device 210 used to connect to base station 220 is powered on and/or when user device 210 enters a connection range of base station 220). In some implementations, the timeslot query may include a request for a timeslot and/or a request for a timing advance.

Process 400 may also include receiving timeslot information from the base station (block 420). For example, user device 210 may receive a timeslot assigned by base station 220 (e.g., a timeslot corresponding to the first millisecond of every second, or some other timeslot) and a reference timing advance to cause user device 210 to send a data block in a manner such that the data block is received in accordance with the timeslot. As an example, assume that user device 210 receives a reference timing advance of one second. Thus, user device 210 may transmit a data block one second earlier than the timeslot. In some implementations, the timeslot information, received by user device 210, may also include information regarding a geographic position of base station 220 (e.g., longitude and latitude coordinates).

Process 400 may further include determining a reference distance (block 430). For example, user device 210 may determine a distance between user device 210 and base station 220 using a global positioning system (GPS) of user device 210 and based on the longitude and latitude coordinates associated with base station 220. In some other implementations, user device 210 may determine a distance between user device 210 and base station 220 using some other device and/or technique (e.g., user device 210 may determine the distance based on a signal strength of a connection between user device 210 and base station 220). As an example, assume that user device 210 is 1000 meters from base station 220. Thus, user device 210 may determine a reference distance of 1000 meters.

Process 400 may also include detecting a position change and determining an updated distance (block 440). For example, user device 210 may detect a position change based on a GPS of user device 210 and/or based on some other technique to determine position change. In some implementations, user device 210 may determine an updated distance between a current geographic position of user device 210 and a geographic position of base station 220 based on information provided by a GPS of user device 210 and/or based on some other location determination technique of user device 210.

In some implementations, the updated distance may correspond to a distance between a current geographic position of user device 210 and a geographic position associated with a target base station 220. For example, assume that user device 210 is connected with a first base station 220-1 (e.g., a source base station). Further assume that user device 210 begins to move away from base station 220-1 and towards a second base station 220-2 (e.g., a target base station). In some implementations, base station 220-1 may provide user device 210 with a handoff instruction with position information of base station 220-2 such that user device 210 may disconnect from base station 220-1 and connect with base station 220-2. In some implementations, user device 210 may determine an updated distance corresponding to a current position of user device 210 and a position of base station 220-2 (as determined by information included in the handoff instruction).

Process 400 may further include determining a difference between the updated distance and the reference distance (block 450). For example, user device 210 may determine the distance between the updated distance and the reference distance based on the formula: distance difference=updated distance−reference distance. Thus, assuming that the reference distance is 1000 meters, and the updated distance is 2000 meters, user device 210 may determine a difference distance of 1000 meters (e.g., 2000 meters−1000 meters).

Process 400 may also include determining an updated timing advance (block 460). For example, user device 210 may perform a timing advance determination function to determine an updated timing advance based on the formula: updated timing advance (in seconds)≈(difference distance/reference distance)+1*reference timing advance (in seconds). Thus, assuming that the difference distance is 1000 meters the reference distance is 1000 meters, and the reference timing advance is 1 second, user device 210 may determine an updating timing advance approximately equal to: (1000 meters/1000 meters)+1*1 second=2 seconds. In some implementations, user device 210 may determine an updated timing advance based on the formula: updated timing advance (in seconds)≈(updated distance/reference distance)*reference timing advance (in seconds). Additionally, or alternatively, the updated timing advance may be determined based on some other formula, algorithm, or combination of formulas or algorithms.

In some implementations, the updated timing advance may be expressed in terms of a quantity of bit periods. In some implementations, a bit period may correspond to a time, such as 3 milliseconds, 4 milliseconds, 5 milliseconds, or some other time. Additionally, or alternatively, the updated timing advance may be expressed in some other unit of measure relating to time.

In some implementations, the timing advance determination function may trigger at any given time such that user device 210 may determine an updated timing advance based on a reference timing advance, a reference distance, and an updated distance, as described above. In some implementations, the timing advance determination function may trigger when user device 210 is relocated a particular threshold distance from base station 220 (e.g., a distance which may correspond to position that is outside of a querying range of base station 220). In some implementations, the timing advance determination function may trigger even when user device 210 is within a querying range of base station 220 (e.g., such that user device 210 may determine an updated timing advance without querying base station 220 for the updated timing advance).

Process 400 may also include applying the updated timing advance (block 470). For example, user device 210 may apply the updating timing advance such that user device 210 may provide base station 220 (e.g., a source base station 220 or a target base station 220) with data blocks in accordance with the timeslot associated with user device 210 even when user device 210 is outside of a querying range of base station 220.

While a particular series of blocks have been described above with regards to FIG. 4, the order of the blocks may be modified in other implementations. Further, non-dependent blocks may be performed in parallel. For example, blocks 410 and 420 may be performed independently of blocks 430-470 and may be repeated when user device 210 is within a querying range of base station 220. Further, while specific examples of reference timing advances, reference distances, and updated distances is described above, in practice, the reference timing advances, reference distances, and updated distances may be different than the examples given and may also be determined in a different manner than what is described above.

Figure 5:
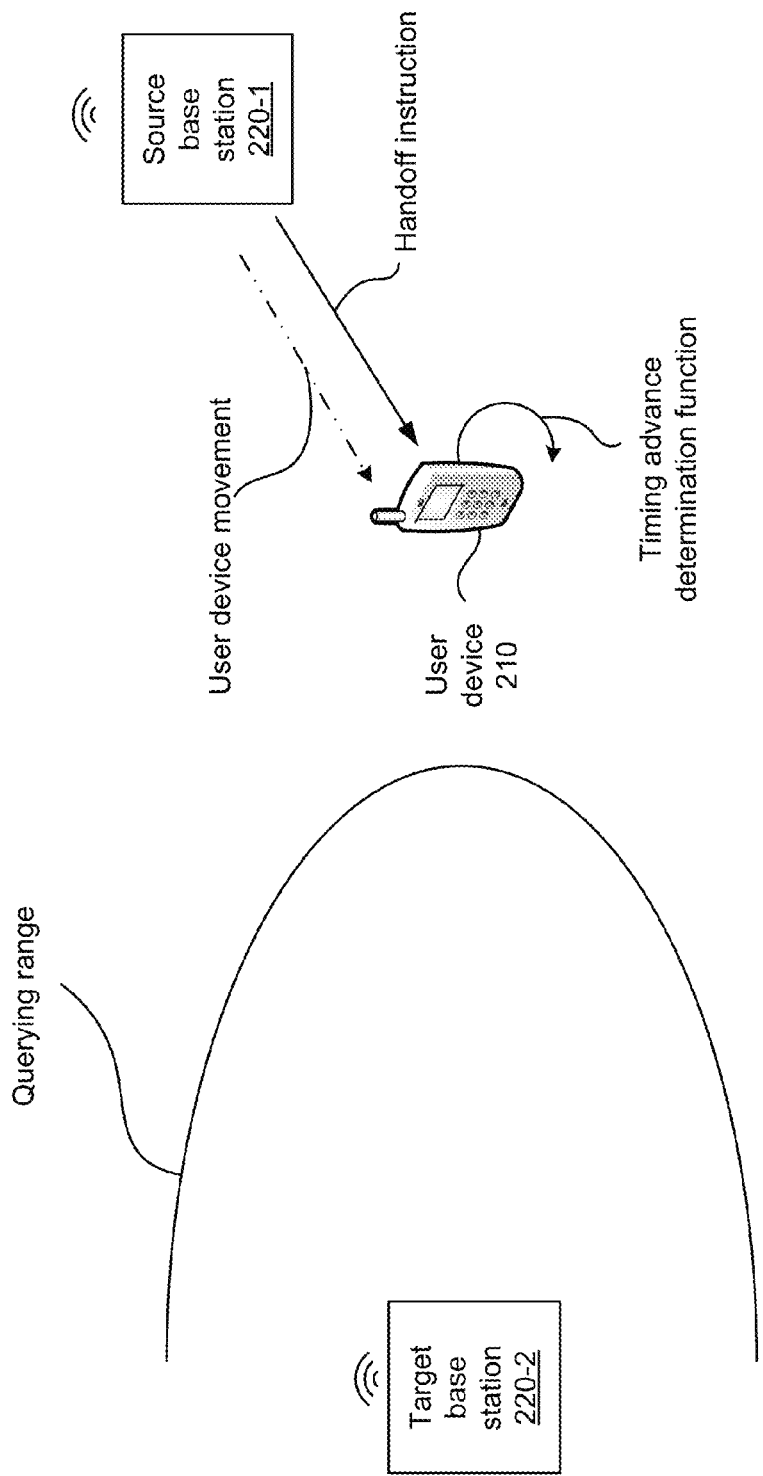
FIG. 5 illustrates an example implementation as described herein.

FIG. 5 illustrates an example process as described above with respect to FIG. 4. In some implementations, FIG. 5 may illustrate a timing advance determination function being performed by the user device when the user device receives a handoff instruction. In FIG. 5, assume that user device 210 connects with first base station 220-1 (e.g., a source base station) and moves away from base station 220-1 towards a second base station 220-2 (e.g., a target base station). Further assume that user device 210 is assigned with a particular timeslot relating to when base station 220-1 and base station 220-2 may receive data blocks from user device 210.

In some implementations, user device 210 may receive a handoff instruction from base station 220-1 when user device 210 relocates to a threshold distance from base station 220-1 and within a threshold distance from base station 220-2. In some implementations, the handoff instruction may include an instruction to cause user device 210 to perform a handoff function such that user device 210 may disconnect from base station 220-1 and connect to base station 220-2 (e.g., as user device 210 moves away from base station 220-1 and moves towards base station 220-2). The handoff instruction may also include information identifying a geographic position of base station 220-2 (e.g., longitude and latitude coordinates) and may also include a reference timing advance. In FIG. 5, assume that user device 210 receives the handoff instruction while outside of a querying range of base station 220-2 (e.g., user device 210 may not receive timing advance information from base station 220-2).

As described above with respect to process 400, user device 210 may determine an updated timing advance based on a reference timing advance, a reference distance, and an updated distance. As described above, user device 210 may receive the reference timing advance from base station 220-1 as part of the handoff instruction. In some implementations, user device 210 may determine a reference distance (e.g., as described above with respect to block 430) when receiving the handoff instruction (e.g., a distance corresponding to a distance between user device 210 and base station 220-1). As described above (e.g., with respect to block 440), user device 210 may determine an updated distance based on a distance between user device 210 and a target base station (e.g., base station 220-2) when user device 210 receives the handoff instruction with information regarding a geographic position of the target base station.

As shown in FIG. 5, user device 210 may perform a timing advance determination function to determine an updated timing advance. In some implementations, user device 210 may determine an updated timing advance to send a radio resource control (RRC) signal to base station 220-2 such that the RRC signal is received in accordance with the timeslot associated with user device 210. In some implementations, the RRC signal may be used to establish a connection between user device 210 and base station 220-2. As a result, base station 220-2 may receive the RRC signal in accordance with the timeslot associated with user device 210 such that a connection between user device 210 and base station 220-2 may be established in the context of user device 210 receiving a handoff instruction from base station 220-1 as user device 210 moves away from base station 220-1 and towards base station 220-2.

While a particular example is shown in FIG. 5, it will be apparent that the above description is merely an example implementation and user device 210 may trigger the timing advance determination function at anytime. For example, user device 210 may trigger the timing advance determination function when user device 210 moves a threshold distance from base station 220. Further, user device 210 may stop the timing advance determination function when user device 210 moves to within a threshold distance of base station 220.

In some implementations, user device 210 may use the updated timing advanced, to determine when to send a data block in accordance with a timeslot assigned to user device 210 in which base station 220 has scheduled the data block to be received. As a result of user device 210 performing the timing advance determination function to determine the updated timing advance, base station 220 may continue to receive data blocks in accordance with an assigned timeslot even when the user device does not receive the timing advance information from the base station (e.g., when user device 210 is outside of a querying range of base station 220). Further, a target base station 220 may receive data blocks (e.g., data blocks associated with an RRC message) based on the timing advance determined by user device 210 in order to establish a connection between user device 210 and the target base station 220.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   providing, by a user device, a query to a first network device,
      the query including a request for timeslot information and a request for a first timing advance value,
         the timeslot information identifying a time during which the user device is to send data blocks;
   receiving, by the user device and from the first network device, a response associated with the query,
      the response including the timeslot information and the first timing advance value,
         the first timing advance value being used, by the user device, to send a first data block to the first network device during the time identified by the timeslot information;
   determining, by the user device, a first distance based on receiving the response,
      the first distance corresponding to a distance between a first position of the user device and a position of the first network device,
      the first position being within a querying range of the first network device;
   detecting, by the user device, a change in position of the user device to a second position that is different than the first position;
   determining, by the user device, a second distance between the second position and the position of the first network device based on determining the change in position of the user device,
      the second position being outside the querying range of the first network device; and
   determining, by the user device and after determining the change in position of the user device, a second timing advance value without the user device receiving the second timing advance value from the first network device,
      the second timing advance value being determined based on the first timing advance value, the first distance, or the second distance,
      the second timing advance value being used, by the user device, to send a second data block to the first network device during the time identified by the timeslot information.

2. The method of claim 1, where the second distance is a distance between a current geographic position of the user device and a geographic position of the first network device.

3. The method of claim 1, further comprising:
   receiving a handoff instruction from the first network device when the first distance satisfies a threshold, the handoff instruction including a third timing advance value, information regarding a geographic position of a second network device, and an instruction to disconnect from the first network device and connect with the second network device;
   where a third distance relates to a distance between a current geographic position of the user device and the geographic position of the second network device; and
   determining a fourth timing advance value based on the first distance, the third distance, and the third timing advance value,
      the fourth timing advance value being used by the user device to send a connection establishment signal to the second network device during the time identified by the timeslot information.

4. The method of claim 1, where the second timing advance value is determined in terms of seconds and is based on the second distance, the first distance, and the first timing advance value.

5. The method of claim 1, where determining the second timing advance value includes determining the second timing advance value based on the second distance satisfying a threshold relating to the user device being outside of the querying range of the first network device,
   the querying range relating to a range in which the first network device is able to respond to the query received by the user device.

6. The method of claim 1, where determining the second timing advance value includes determining the second timing advance value based on the first distance satisfying a threshold value relating to the user device being within the querying range of the first network device.

7. The method of claim 1, further comprising:
   preventing the user device from determining the second timing advance value based on the first distance satisfying a threshold value relating to the user device being within the querying range of the first network device.

8. A system comprising:
   a user device, comprising a memory and a processor, to:
      provide a query to a first network device,
         the query including a request for timeslot information and a request for a first timing advance value;
      receive, from the first network device, a response associated with the query,
         the response including the timeslot information and the first timing advance value,
            the first timing advance value being used by the user device to send a first data block to the first network device in accordance with the timeslot information;
      determine a first distance based on receiving the response,
         the first distance corresponding to a distance between a first position of the user device and a position of the first network device;
      detect a change in position of the user device to a second position;
      determine a second distance between the second position of the user device and the position of the first network device based on detecting the change in position of the user device,
         the second position being outside a querying range of the first network device; and
      determine, after detecting the change in position of the user device, a second timing advance value without the user device receiving the second timing advance value from the first network device, the second timing advance value being determined based on the first timing advance value, the first distance, or the second distance, the second timing advance value being used, by the user device, to send a second data block to the first network device in accordance with the timeslot information, the second timing advance value being expressed in seconds or bit periods.

9. The system of claim 8, where the second distance is a distance between a current geographic position of the user device and a geographic position of the first network device.

10. The system of claim 8, where the user device is further to:

receive a handoff instruction from the first network device when the first distance satisfies a threshold relating to the querying range, the handoff instruction including a third timing advance value, information regarding a geographic position of a second network device, and an instruction to disconnect from the first network device and connect with the second network device, where a third distance relates to a distance between a current geographic position of the user device and the geographic position of the second network device; and determine a fourth timing advance value based on the first distance, the third distance, and the third timing advance value, the fourth timing advance value being used by the user device to send a connection establishment signal to the second network device in accordance with the timeslot information.

11. The system of claim 8, where the second timing advance value is determined in terms of seconds and is based on the second distance, the first distance, and the first timing advance value.

12. The system of claim 8, where, when determining the second timing advance value, the user device is further to:

determine the second timing advance value based on the first distance satisfying a threshold relating to the user device being outside of the querying range of the first network device, the querying range relating to a range in which the first network device responds to the query received by the user device.

13. The system of claim 8, where, when determining the second timing advance value, the user device is further to:

determine the second timing advance value based on the first distance satisfying a threshold value relating to the user device being within the querying range of the first network device.

14. The system of claim 8, where the user device is further to:

prevent the user device from determining timing advance values based on the first distance satisfying a threshold value relating to the user device being within the querying range of the first network device.

15. A non-transitory computer-readable medium for storing instructions, the instructions comprising:

a plurality of instructions which, when executed by one or more processors associated with a user device, cause the one or more processors to:

provide a query to a first network device, the query including a request for timeslot information and a request for a first timing advance value;

receive, from the first network device, a response associated with the query, the response including the timeslot information and the first timing advance value, the first timing advance value being used, by the user device, to send a first data block to the first network device in accordance with the timeslot information;

determine a first distance based on receiving the response, the first distance corresponding to a distance between a particular geographic position of the user device and a geographic position of the first network device;

detect a change in position of the user device to a current geographic position of the user device;

determine a second distance based on detecting the change in position, the second distance being based on the current geographic position of the user device and the geographic position of the first network device or based on the current geographic position of the user device and a geographic position of a second network device; and determine, after detecting the change in position of the user device, a second timing advance value without the user device receiving the second timing advance value from the first network device, the second timing advance value being determined when the particular geographic position or the current geographic position is outside a querying range of the first network device, the second timing advance value being based on the first timing advance value, the first distance, or the second distance, the second timing advance value causing the user device to send a second data block to the first network device or to the second network device in accordance with the timeslot information, the user device being prevented from determining the second timing advance value when the particular geographic position or the current geographic position is within the querying range.

16. The non-transitory computer-readable medium of claim 15, where one or more instructions, of the plurality of instructions, further cause the one or more processors to:

receive a handoff instruction from the first network device when the first distance satisfies a threshold, the handoff instruction including a third timing advance value, information regarding the geographic position of the second network device, and an instruction to disconnect from the first network device and connect with the second network device, where the second distance relates to a distance between the current geographic position of the user device and the geographic position of the second network device; and determine a fourth timing advance value based on the first distance, the second distance, and the third timing advance value, the fourth timing advance value being used, by the user device, to send a connection establishment signal to the second network device in accordance with the timeslot information.

17. The non-transitory computer-readable medium of claim 15, where the second timing advance value is determined in terms of seconds, and where one or more instructions, of the plurality of instructions, to determine the second timing advance value include:
one or more instructions to determine the second timing advance value based on a difference between the second distance and the first distance, the first distance, and the first timing advance value.

18. The non-transitory computer-readable medium of claim 15, where one or more instructions, of the plurality instructions, to determine the second timing advance value, include one or more instructions that cause the one or more processors to:
determine the second timing advance value based on the first distance satisfying a threshold relating to the user device being outside of the querying range of the first network device,
the querying range relating to a range in which the first network device is able to respond to the query received from the user device.

19. The non-transitory computer-readable medium of claim 15, where one or more instructions, of the plurality instructions, to determine the second timing advance value, include one or more instructions that cause the one or more processors to:
determine the second timing advance value based on the first distance satisfying a threshold value relating to the user device being within the querying range of the first network device.

20. The non-transitory computer-readable medium of claim 15, where one or more instructions, of the plurality of instructions, further cause the one or more processors to:
prevent the user device from determining the second timing advance value based on the first distance satisfying a threshold value relating to the user device being within the querying range of the first network device.

* * * * *